United States Patent
Shridhar et al.

(10) Patent No.: US 9,065,534 B2
(45) Date of Patent: Jun. 23, 2015

(54) SYSTEM AND METHOD FOR PARTITIONING DSL VECTOR CANCELLATION

(75) Inventors: Avadhani Shridhar, Santa Clara, CA (US); Kevin Fisher, Palo Alto, CA (US)

(73) Assignee: IKANOS COMMUNICATIONS, INC., Fremont, CA (US)

(*) Notice: Subject to any disclaimer, the term of this patent is extended or adjusted under 35 U.S.C. 154(b) by 229 days.

(21) Appl. No.: 13/403,956

(22) Filed: Feb. 23, 2012

(65) Prior Publication Data

US 2013/0051488 A1    Feb. 28, 2013

Related U.S. Application Data

(60) Provisional application No. 61/446,012, filed on Feb. 23, 2011.

(51) Int. Cl.
*H04B 3/32*    (2006.01)

(52) U.S. Cl.
CPC .......................................... *H04B 3/32* (2013.01)

(58) Field of Classification Search
CPC ........................ H04B 3/32; H04L 2025/03496
USPC ................................... 370/201, 497; 375/350
See application file for complete search history.

(56) References Cited

U.S. PATENT DOCUMENTS

| | | | | |
|---|---|---|---|---|
| 7,907,506 | B2* | 3/2011 | Fang et al. | 370/201 |
| 8,724,800 | B2* | 5/2014 | Lu et al. | 379/417 |
| 2003/0086362 | A1* | 5/2003 | Hasegawa et al. | 370/201 |
| 2004/0090927 | A1* | 5/2004 | Zimmerman et al. | 370/268 |
| 2006/0114977 | A1* | 6/2006 | Ginis et al. | 375/222 |
| 2008/0285740 | A1* | 11/2008 | Schelstraete et al. | 379/406.06 |
| 2009/0059780 | A1* | 3/2009 | De Lind Van Wijngaarden et al. | 370/201 |
| 2009/0310502 | A1* | 12/2009 | Nuzman et al. | 370/252 |
| 2010/0220823 | A1* | 9/2010 | Biyani et al. | 375/346 |
| 2010/0329386 | A1* | 12/2010 | De Lind Van Wijngaarden | 375/296 |

(Continued)

FOREIGN PATENT DOCUMENTS

| | | | | |
|---|---|---|---|---|
| WO | WO2009/152188 | * | 12/2009 | ............. H04L 29/02 |
| WO | WO2009/152188 A2 | | 12/2009 | |
| WO | WO2010/002908 A2 | | 1/2010 | |

OTHER PUBLICATIONS

International Search Report and Written Opinion Issued Oct. 18, 2012 for PCT/US2012/026264.

*Primary Examiner* — Benjamin Lamont

(74) *Attorney, Agent, or Firm* — Pillsbury Winthrop Shaw Pittman LLP

(57) ABSTRACT

A DSL system performs crosstalk cancellation using a plurality of vectoring cancellation chips that are partitioned into two or more groups based on DSL victim lines or DSL disturber lines or DSL tones. Embodiments of the invention include both single-criteria and double-criteria partitioning methods. In double-criteria embodiments, the vectoring cancellation VCE chips are first partitioned into two or more victim DSL line groups and then in each group the VCE chips are further partitioned by disturber DSL line processing. Alternately, the vectoring cancellation VCE chips are first partitioned into two or more disturber DSL line groups and then within each group further partitioned by victim DSL line processing. By partitioning the computation as described herein, the invention reduces the bandwidth and the number of links between the chips, without too much co-ordination complexity. This allows crosstalk cancellation across larger vectored groups.

15 Claims, 14 Drawing Sheets

(56) References Cited

U.S. PATENT DOCUMENTS

| | | |
|---|---|---|
| 2010/0329444 A1 | 12/2010 | Ashikhmin et al. |
| 2011/0007623 A1* | 1/2011 | Cendrillon et al. ............ 370/201 |
| 2011/0080938 A1* | 4/2011 | Fisher et al. ................... 375/222 |
| 2012/0020395 A1* | 1/2012 | Domanovitz et al. ......... 375/222 |

* cited by examiner

SYSTEM AND METHOD FOR PARTITIONING DSL VECTOR CANCELLATION

CROSS-REFERENCE TO RELATED APPLICATIONS

The present application claims priority to U.S. Provisional Application No. 61/446,012 filed Feb. 23, 2011, the contents of which are incorporated herein by reference in its entirety.

FIELD OF THE INVENTION

The present invention relates to apparatuses, systems, methods, techniques, etc. for performing DSL vectoring, and more particularly to partitioning DSL vectoring calculations among processors.

BACKGROUND OF THE INVENTION

Vector Cancellation systems for Digital Subscriber Loop (DSL) networks cancel the crosstalk between lines in the vectored group. More particularly, vectoring cancels the line to line crosstalk introduced in the bundle. This is typically done at the central office (CO) side by cancelling the received data on all the lines for the upstream, and for the downstream, by pre-cancelling the data to be transmitted on all the lines. Each DSL chip typically supports multiple DSL ports, and packs its frequency domain data (IFFT input on downstream or FFT output on upstream) and sends it on high speed interfaces such as a SerDes interface to vector canceller chips.

Co-pending U.S. Appln. Publ. No. 2011/0080938, the contents of which are incorporated herein by reference in their entirety, advanced that state of the art of vectored DSL crosstalk cancellation. However, the present inventors recognize that certain challenges remain.

SUMMARY OF THE INVENTION

A DSL system performs crosstalk cancellation using a plurality of vectoring cancellation chips that are partitioned into two or more groups based on DSL victim lines or DSL disturber lines or DSL tones. Embodiments of the invention include both single-criteria and double-criteria partitioning methods. In double-criteria embodiments, the vectoring cancellation VCE chips are first partitioned into two or more victim DSL line groups and then in each group the VCE chips are further partitioned by disturber DSL line processing. Alternately, the vectoring cancellation VCE chips are first partitioned into two or more disturber DSL line groups and then within each group further partitioned by victim DSL line processing. According to certain aspects, by partitioning the computation as described herein, the invention reduces the bandwidth and the number of links between the chips, without too much co-ordination complexity. This makes it feasible to partition across a larger number of chips, thereby allowing crosstalk cancellation across larger vectored groups.

In accordance with these and other aspects, a method for performing vectored DSL crosstalk cancellation in a DSL system according to embodiments of the invention includes: defining D disturber lines in the DSL system; defining V victim lines in the DSL system; defining T DSL tones in the DSL system; partitioning crosstalk cancellation among a plurality of vectoring cancellation chips by a single criteria, the single criteria being one of the disturber lines, the victim lines and the tones; and causing each of the vectoring cancellation chips to perform a partial cancellation based on the single criteria.

In further accordance with these and other aspects, a method for performing vectored DSL crosstalk cancellation in a DSL system according to embodiments of the invention includes: defining D disturber lines in the DSL system; defining V victim lines in the DSL system; defining T DSL tones in the DSL system; partitioning crosstalk cancellation among a plurality of vectoring cancellation chips by a double criteria, the double criteria being one of the victim-disturber partitioning and disturber-victim partitioning; and causing each of the vectoring cancellation chips to perform a partial cancellation based on the double criteria.

In yet further accordance with these and other aspects, a vector cancellation system for a DSL system having D disturber lines, V victim lines in the DSL system and T DSL tones according to embodiments of the invention includes: a first plurality of vector cancellation chips; and a second plurality of vector cancellation chips, the first plurality of vector cancellation chips performing partial cancellation for a criteria being one of the disturber lines, the victim lines and the tones.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
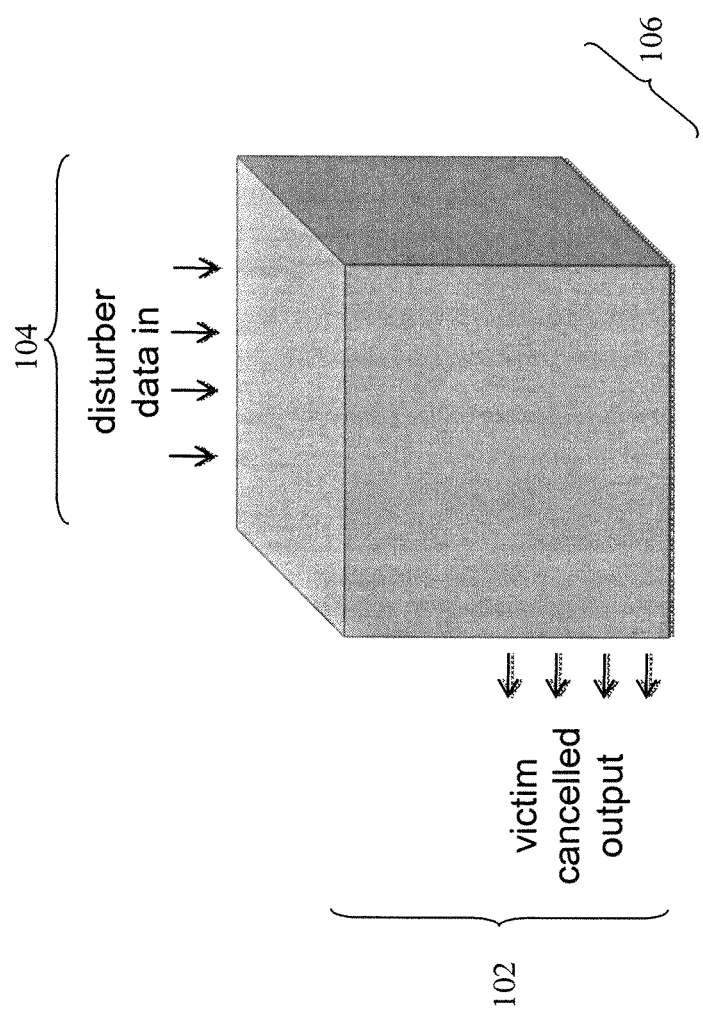
FIG. 1 pictorially illustrates aspects of vector cancellation according to the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

More particularly, the following detailed description, including the Figures, will refer to one or more embodiments of the invention, but is not limited to such embodiments. Rather, the detailed description is intended only to be illustrative. Those skilled in the art will readily appreciate that the detailed description given with respect to the Figures is provided for explanatory purposes only. Apparatus, systems, methods, techniques, etc. according to the invention include and pertain to (but not limited to) improving transmissions on a communication system, for example a DSL system or the like. For example, in connection with a DSL system on which data signals are vectored to remove the effects of induced crosstalk, embodiments of DSL vectoring systems and the like improve data processing and transmission between upstream-end transmission equipment and the like and vector processing devices configured to address crosstalk present in DSL communications on a given network. Other methods, components, systems, structures, uses, etc. will be apparent to those skilled in the art after considering the following disclosure and the Figures provided herewith.

As background, the basic principle behind vectoring is coordinating communications between every twisted pair in a telephone cable. Because all twisted pairs in the cable terminate in one central location known as a DSLAM (DSL access multiplexer), the DSLAM is the natural location to coordinate this communication. To vector the modems effectively in the vectoring systems, the modems must be synchronized to the same DMT symbol clock and must have synchronized training/tracking periods with pre-arranged training data patterns (unique to each modem) to allow victim modems to identify the crosstalk channel characteristics between particular disturber-victim modem pairs. As will be appreciated by those skilled in the art, there are a variety of techniques for identifying crosstalk in such systems, including one or more that may be described in various applicable standards pertaining to DSL systems and their implementation.

Using the "crosstalk topography" or mapping determined during training and the like (which typically is viewed or considered as a matrix of coefficients representing the various interactive/crosstalking relationships between DSL lines), transmit pre-compensation (for example, precoding) can be used in the downstream direction (from DSLAM to customer site). In effect, the transmit waveform for a given modem is pre-distorted based on the transmit waveforms being used by many other modems (that is, the other modems whose FEXT materially affect the given modem's signals), such that the interfering FEXT is effectively balanced and its effects thus eliminated by the time the pre-distorted modem signal reaches its customer side terminus. In the upstream direction (from customer site to DSLAM), MIMO (multiple-input-multiple-output) spatial filtering is used at the DSLAM to cancel upstream FEXT at the upstream receive side. Identification and tracking of the FEXT filter cancellation coefficients may be performed using the LMS (Least Mean Squares) adaptive algorithm or other Least-Squares type methods, as is well known to those skilled in the art. Training signals to support identification of the FEXT filter coefficients may be integrated into a modified version of a known DSL standard, such as VDSL2.

A typical telephone cable or grouping of multiple cables terminating in one telco "central office," "CO," "node," "cabinet," etc. may contain anywhere from 50 to 2,000 (or more) twisted pairs, potentially spread among a dozen or more binder cables. As a result of telco deployment practices, modems assigned to twisted pairs in the same binder cable may not be connected to the same line card or DSLAM chassis. This occurs because telcos add line cards to a chassis (or add one or more additional chassis) as customers subscribe to DSL service. Modem ports are assigned on a "first-come-first-served" basis, rather than being grouped together based on user identity, downstream terminus location, etc. Even if the telco practices were different, it would be an operational (and error-prone) challenge to segregate phone lines according to binder of origin (a practice known as binder group management). Empirical cable measurements have shown that significant FEXT coupling can come from adjacent binders or even different cables that terminate in the same telco node due to the use of a "cross box" or patch panel in the telco node. These patch panels are used to map individual copper pairs (possibly from different binders or telco cables) to specific modem ports on the DSLAM line cards.

Another related issue is the practice of bonding multiple modem ports together. Bonding can increase the customer data rate in situations where a single modem port cannot provide the desired data rate. A customer who has started with a single modem port can have a second port added as an upgrade to provide additional services to the customer (the multiple-port DSL service thus has the potential to carry more data, operate at faster speeds, etc.). Many current systems require bonded modem ports to be connected to the same line card. This is impractical for most telcos for the same reasons that binder group management is impractical, as discussed above.

Finally, the computational demands of DSL vectoring—especially the real-time processing of crosstalk information in connection with user data signals—create data transmission and processing bottlenecks and other problems. The large volume of data that needs to be processed quickly (to reduce latency/delays) must be transmitted and processed efficiently. Embodiments of the co-pending application provide systems, apparatus and methods that provide such efficient handling and processing of these large amounts of data while having little negative effect on the latency and/or performance of the DSL lines being vectored.

To implement vectoring, each modem in a chassis must exchange real-time FEXT information with the other modems in the chassis (or even multiple chassis units). Typical DSL modems use a DMT symbol rate in the range of 4 kHz to 8 kHz, and FEXT cancellation must be done over the vectored bandwidth once per DMT symbol with a processing delay on the order of a few DMT symbols (or less) to avoid degrading the overall latency of the end-to-end modem system. This creates a complex and challenging data networking environment in which each line card shares real-time FEXT information from each of its modems with each of the other modems in the system (which might include modems on another line card or chassis in the system). In a typical DSLAM system, the communication flow of vectoring information can total tens of gigabits per second. Current generation DSLAM copper backplanes generally cannot handle this additional communication load, and future DSLAM copper backplanes need a practical method for managing this communication flow with reasonable complexity and operational performance.

The co-pending application describes apparatuses, systems, methods, etc. that eliminate or substantially reduce the communication bottlenecks that otherwise would confront vectored DSL systems. These embodiments are scalable, from small port-count systems (for example, a single line card system) up to much larger systems, with thousands of modem ports spread across multiple line cards and/or multiple chassis. Embodiments of the co-pending application work with both optical interconnect technologies (in the case of multiple chassis systems or line card upgrades to legacy chassis equipment) and also work with future copper interconnect technologies in which all communications flow within a single DSLAM on a copper backplane or using high bandwidth copper interconnect. Embodiments of the co-pending application also permit "virtual bonding" that allows telcos to virtually bond modem ports across multiple line cards and/or multiple chassis.

In one example embodiment that can be used to implement the present invention, the co-pending application describes in connection with its FIG. 1 a vectoring data communication system in which line cards contain DSL modems (for example, multi-port devices) that control communications on twisted-pair lines. Multiple line cards are connected via a high speed communication apparatus, such as XAUI lines or the like, to a centralized vectoring module (which can be, for example, a vectoring card). XAUI is the standard for extending the XGMII (10 Gigabit Media Independent Interface) between the MAC and PHY layer of 10 Gigabit Ethernet (10 GbE) and such high-speed data communication lines can be used to connect modems to line card vector router components (VRC-Ls). The VRC-Ls form an abstraction layer for the modem, as the modem needs to connect to only one VRC-L and the complexity of the specific vectoring deployment (for example, number of ports, line cards, etc.) is thus hidden from each modem. The VRC-L can be a separate chip from the DSL modem chip, or it can be a module included inside the DSL modem chip itself.

The vectoring data flow from each modem to its respective VRC-L includes frequency domain samples for downstream and upstream communications—that is, IFFT-input transmit (TX) data for downstream vectoring and/or FFT-output receive (RX) data for upstream vectoring. The data returned to each modem from the vectoring module via a VRC-L is the modem's crosstalk-adjusted (that is, vectored) IFFT-input and/or FFT-output data that is conditioned and/or processed to prevent and/or remove crosstalk interference from other vectoring system modems. The VRC-L in each line card acts as an interface between that line card's modems and the vectoring module. High-speed communication lines (for example, 10-40 Gbps or higher optical or copper interconnect) network a VRC-L on each line card to a companion VRC-V on the vectoring module. 10-40 Gbps is a common data communication requirement that can be implemented between the vectoring module and each line card. Today this would mostly likely be an aggregation of 5 Gbps or 10 Gbps XAUI lines or similar, whether over the electrical backplane or the optical cable.

The VRC-Vs on a vectoring module subdivide the modem vectoring data stream into sub-bands for subsequent crosstalk cancellation in one or more vector processors, as defined by system requirements. The vector processors may also be referred to as "vector processor components," "computational devices," "vectoring cancellation (VCE) chips" and/or the like. That is, data is removed from a normal (that is, non-vectored) data stream in each modem and is reorganized into data bundles defined by frequency characteristics so that the data can be crosstalk-processed on a frequency basis (for example, tone-by-tone, groups of tones, etc.). Once processed, the data is then again reorganized from the frequency-based bundles used for crosstalk-removal processing and is reassembled for transmission/use by the modems.

For example, upstream and downstream bands can be vector routed by one or more VRCs (for example, a VRC-L/VRC-V pair) to individual VCEs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VCE assignment can be based on evenly spaced sub-bands (independent of upstream and downstream band allocation). Data transmission between VRC-Vs and VCEs on the vectoring module can be performed using high speed interconnect lines (for example, XAUI or the like).

According to certain aspects, the present inventors recognize that the amounts of memory and computation required to cancel crosstalk in some DSL systems are proportional to the square of the number of lines in the vectored group. For a vectored group with a large number of lines, it is therefore not possible to fit the required memory and computation logic within one chip and thus this logic needs to be distributed across or partitioned among multiple chips that together perform the crosstalk cancellation for the vectored group. The vector canceller (VCE) chips such as those described above need to exchange data between themselves, which can be done using point-to-point high-speed serializer/deserializer (SerDes) links. The amount of data exchanged between and/or among the chips and the complexity of coordinating the chips depends on how the computation is partitioned (physically, logically or both) across, among and/or between the chips.

The port whose data is affected by crosstalk (and for which the output is being calculated) is called the "victim" port (or victim line), and the ports whose crosstalk contributions are cancelled are called the "disturber" ports (or disturber lines). As set forth above, the crosstalk between a pair of lines for a given tone can be represented by a coefficient determined during training, for example. Therefore, if there are N ports for which crosstalk cancellation is desired, and T tones per DSL symbol, an $N^2$ matrix of coefficients exists for each tone, and a total of (N*N*T) coefficients must be used. The calculation is done as below.

Let $x[t,d]$ be the input for tone 't' of disturber port 'd';

and $y[t,v]$ be the crosstalk cancelled output for tone 't' for victim port 'v';

and $h[t,d,v]$ be the crosstalk coefficient for tone 't' of disturber port 'd' on victim port 'v';

Note that x, y, and h can all be complex numbers. The calculation of $y[t,v]$ is as in the equation below.

$$y[t,v]=\Sigma(x[t,d]*h[t,d,v]) \text{ for all disturbers affecting victim port } v \quad \text{(Eq. 1)}$$

Note that in the above equation, the coefficient $h[t,d=v,v]$ representing a line's disturber onto itself is set to 1. This allows the output to add the transmitted value on the line to the corrections for the other lines in the same equation. Accordingly, $y[t,v]$ is calculated above for all tones t=0 to T−1, all disturbers d=0 to N−1, and all victims v=0 to N−1, to get the crosstalk cancellation output for all tones for all victims.

Thus the total number of calculations for a full cancellation system is (N*N*T) per symbol. For a VDSL2 17a profile system, for example, the symbol rate is 4000 symbols/sec and there are 4096 tones per symbol. A vectored system having 192 ports using the VDSL2 17a profile, will therefore need to do 192*192*4096*4000=approx 603 Gig complex multiply-accumulate functions (MACs) per second. Meanwhile, although capabilities vary widely, conventional programmable DSP cores might achieve 5 to 10 Gig MACs per second, and several cores might be integrated on a single chip. Still, several chips may be needed, especially for systems requiring 768 ports or more.

According to certain aspects, therefore, the present invention includes apparatuses, systems, methods, techniques, etc. for distributing and/or partitioning the cancellation computation. Embodiments include single-criteria partitioning such as victim-based partitioning, disturber-based partitioning and tone-based partitioning. Embodiments further include double-criteria partitioning such as victim-disturber partitioning, or disturber-victim partitioning. When compared with single-criteria partitioned vectoring cancellation systems, a double-criteria victim-disturber (or disturber-victim) partitioning reduces the bandwidth and the number of links between the chips and performs with less complexity than single-criteria partitioned systems. This makes it feasible to partition across a larger number of chips, thereby allowing crosstalk cancellation across larger vectored groups and providing a more readily scalable system than conventional systems.

In embodiments, the computations (including the storage of the coefficients used) can be partitioned into multiple canceller chips, with each canceller chip (also referred to as a "vectoring cancellation chip," a "VCE chip," or the like herein) handling a part of the computation (i.e. partial cancellation).

FIG. 1 shows the crosstalk cancellation calculations pictorially as a three-dimensional array, with one axis of the array 102 indicating the rows of victims, another axis 104 indicating the columns of disturbers, and the final axis 106 indicating the tones. The coefficients $h[t,d,v]$ can be considered as elements of the three-dimensional array, and each element conceptually has a complex multiply-accumulate (MAC) associated with the element. Disturber data $x[t,d]$ is fed in from the top, gets multiplied with cancellation coefficients and the calculated $y[t,v]$ is shown exiting to the left.

As will be described in more detail below, partitioning of the computation into several vectoring cancellation chips can be accomplished in various ways. If the total number of vectoring cancellation chips is defined as C, the vectoring cancellation chips be referred to as $VCE_0, VCE_1, \ldots VCE_{C-1}$. Each chip can be connected directly to the digital signal processing (DSP) chips (or other hardware) handling a number of ports (for example, N/C ports, where N again is the total number of ports in the vectored DSL group—meaning there are N DSL lines coupled to the vectoring system).

Each vectoring cancellation chip collects disturber d's data $x[t,d]$ every symbol for every tone t, for the N/C DSL ports on the DSP chip(s) to which the vectoring cancellation chip is connected.

After computation of the crosstalk cancelled output $y[t,v]$ is done, each vectoring cancellation chip sends the crosstalk cancelled output $y[t,v]$ for the N/C DSL ports to whose DSP chips it is connected to.

It is assumed here for simplicity of explanation, that N (the number of ports in the vectored group) is a multiple of C in one or more embodiments described below. If this is not the case in some systems, crosstalk cancellation can be performed in an analogous manner as described below, except that one of the vectoring cancellation chips will have a different amount of computation. Those skilled in the art will appreciate that various alternatives are possible.

Partition by Victims

Figure 2:
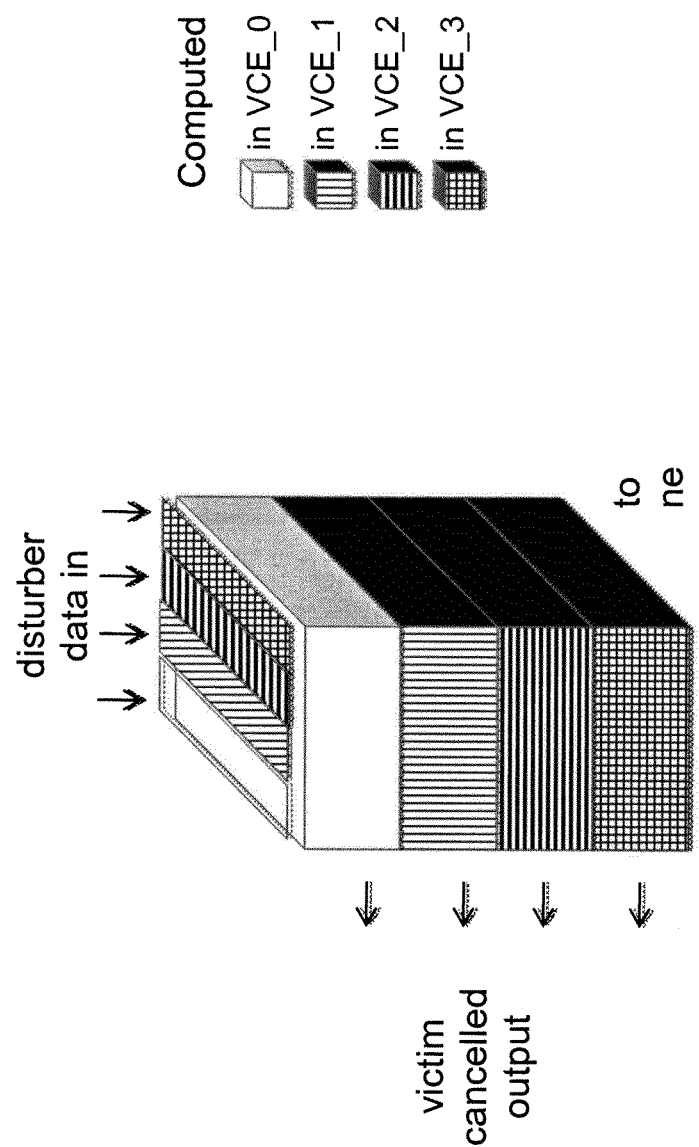
FIG. 2 pictorially illustrates a first partitioning for vector cancellation according to the invention.

In a system in which computational responsibility is apportioned to the C vectoring cancellation VCE chips based on victims, each vectoring cancellation VCE chip can, for example, handle (N/C) victims. That is, each vectoring cancellation VCE chip does the computations for all the disturbers and all the tones for N/C victim rows. FIG. 2 shows such calculations pictorially for this "partitioning by victims" mode. The computations done by the $m^{th}$ vectoring cancellation VCE chip, $VCE_m$, are as follows:

$y[t,v]$ for t=0 to T−1, for the victims v=m*(N/C) to ((m+1)*(N/C))−1, where $y[t,v]=\Sigma(x[t,d]*h[t,d,v])$ for all disturbers d=0 to N−1 affecting victim port $v$ \quad Eq. 2

This type of system is simple in terms of coordination, but needs high bandwidth between the various vectoring cancellation VCE chips because all of the disturber data must be sent to all of the vectoring cancellation VCE chips. Each vectoring cancellation VCE chip needs to connected to all other vectoring cancellation VCE chips to send its disturber data to all other VCE chips and receive disturber data from all other VCE chips.

Partition by Disturbers

Figure 3:
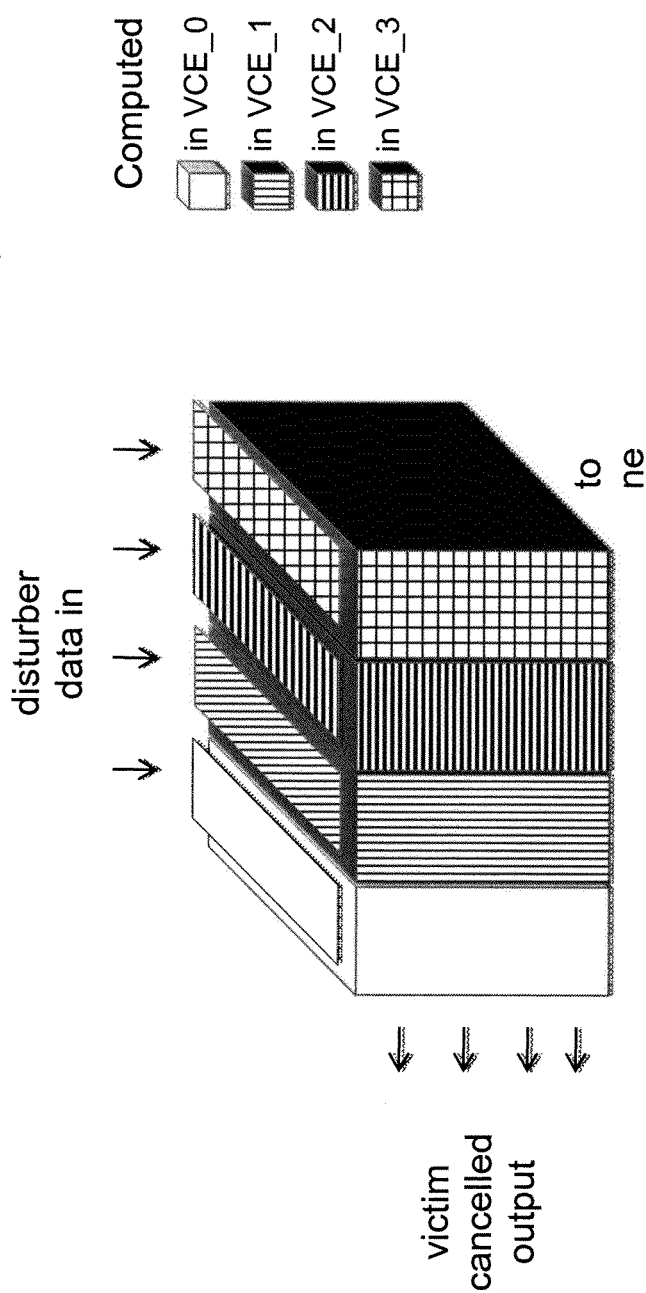
FIG. 3 pictorially illustrates a second partitioning for vector cancellation according to the invention.

Somewhat analogous to the "partitioning by victims" mode, in a "partitioning by disturbers" mode, each vectoring cancellation VCE chip can handle (N/C) disturbers. That is, each vectoring cancellation VCE chip does the computations for all of the victims and all the tones for N/C disturber columns. FIG. 3 shows such calculations pictorially for this "partitioning by disturbers" case. The $m^{th}$ vectoring cancellation VCE chip, $VCE_m$, first calculates $z[t,v,m]$ for $t=0$ to $T-1$ and $v=0$ to $N-1$, where $$z[t,v,m]=\Sigma(x[t,d]*h[t,d,v]) \text{ for disturbers } d=m*(N/C) \text{ to } ((m+1)*(N/C))-1 \qquad \text{Eq. 3}$$

The $z[t,v,m]$ are partial accumulated products, and these need to be summed together to get the final output sum $y[t,v]$. Each vectoring cancellation VCE chip calculates the final sum $y[t,v]$ for the DSL ports to which it is connected. The $m^{th}$ vectoring cancellation VCE chip, $VCE_m$ calculates the final sum:

$$y[t,v] \text{ for } t=0 \text{ to } T-1, \text{ for the victims } v=m*(N/C) \text{ to } ((m+1)*(N/C))-1,$$

$$\text{where } y[t,v]=\Sigma(z[t,v,m]) \text{ for } m=0 \text{ to } C-1 \qquad \text{Eq. 4}$$

Each vectoring cancellation VCE chip forwards the partial accumulated products $z[t,v,m]$ based on the 'v' index range to the vectoring cancellation VCE chip that is doing the final sum $y[t,v]$ for those 'v' (victims) values.

This requires slightly more complicated coordination, as it requires partial accumulated products to be exchanged between various vectoring cancellation VCE chips. As with the "partitioning by victim" mode, each vectoring cancellation VCE chip needs to connect to all other vectoring cancellation VCE chips to send partial accumulated products that it calculates and receive partial accumulated products calculated by other VCE chips.

Partition by Tones

Figure 4:
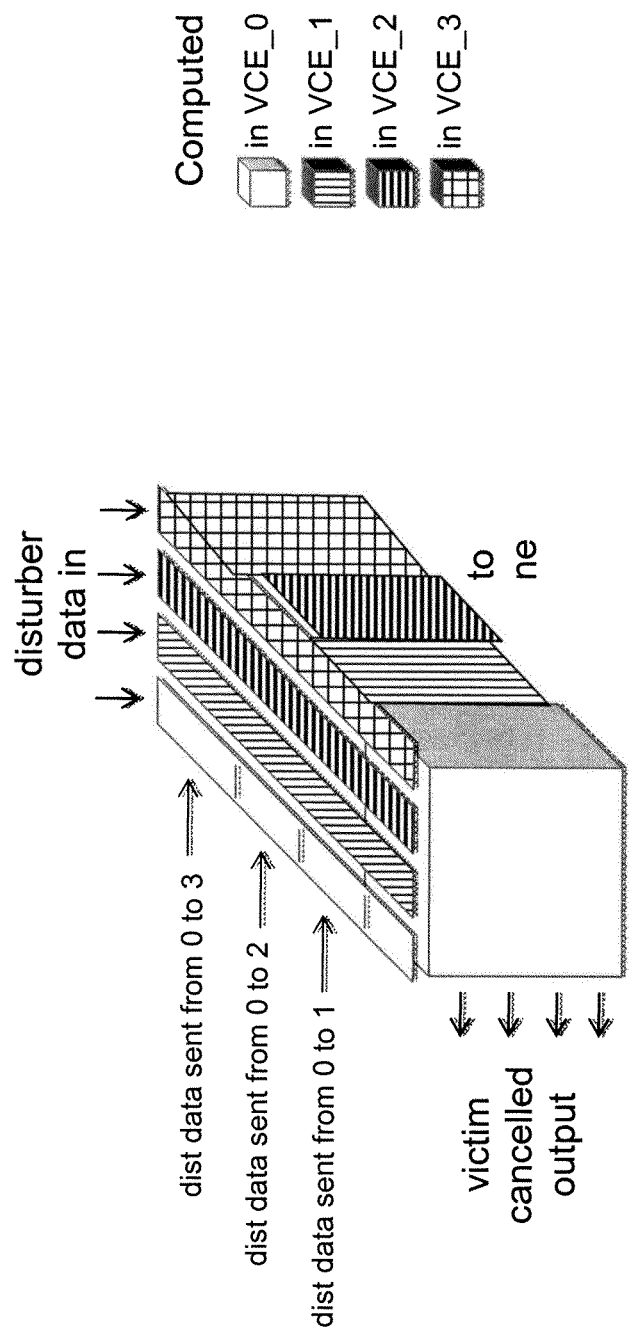
FIG. 4 pictorially illustrates a third partitioning for vector cancellation according to the invention.

In a "partitioning by tones" mode of operation, each vectoring cancellation VCE chip can handle (T/C) tones. That is, each vectoring cancellation VCE chip does the computations for all of the victims and of all the disturbers for T/C tones. FIG. 4 shows such calculations pictorially for this partitioning by tones mode. The computations done by the $m^{th}$ VCE chip, $VCE_m$, can be as follows:

$$y[t,v] \text{ for } v=0 \text{ to } N-1, \text{ for the tones } t=m*(T/C) \text{ to } ((m+1)*(T/C))-1,$$

$$\text{where } y[t,v]=\Sigma(x[t,d]*h[t,d,v]) \text{ for all disturbers } d=0 \text{ to } N-1 \text{ affecting victim port } v \qquad \text{Eq. 5}$$

This requires more complicated coordination because disturber data needs to be sent by one vectoring cancellation VCE chip to another vectoring cancellation VCE chip based on the tones that each vectoring cancellation VCE chip is processing. Subsequently, each vectoring cancellation VCE chip gets back the computed results from other VCE's for those tones processed by the other VCEs, and sends these computed results back to the appropriate DSP. This type of operation requires lower bandwidth between the vectoring cancellation VCE chips than the partitioning by victims or by disturbers, but such chip still needs to connect to all other vectoring cancellation VCE chips.

In the above three methods, each vectoring cancellation VCE chip needs to connect to all other such chips, so that in system having C such VCE chips, the number of logical links between the VCE chips is:

$$(C(C-1))/2$$

The bandwidth carried on each logical link varies among the above single-criteria partitioning methods and is least for the "partition by tones" mode of operation, though this operational mode has the highest complexity in terms of coordination of vectoring cancellation VCE chips. Depending on the bandwidth between VCE chips, each logical link between such chips will be implemented with one or more physical links (typically SerDes links).

According to aspects, embodiments of the invention reduce the number of links required using further double-criteria partitioning techniques.

Partition by Victims and Disturbers

More particularly, for additional or other advantages, embodiments of the invention use double-criteria-based partitioning. For example in a victim-disturber double partitioning, as shown in one exemplary system 500 in FIG. 5, six VCE chips 510 can be split into two chip groups (for example, based on DSP chips corresponding to a first DSLAM 531 and DSP chips corresponding to a second DSLAM 532).

In a victim-disturber double partitioning according to embodiments of the invention, the cancellation is partitioned across VCEs into groups by victim and then within each group by disturbers. So in the example system 500 of FIG. 5, where DSLAM 531 has three vectoring cancellation VCE chips 510, as does DSLAM 532, a victim-disturber partitioning scheme partitions cancelling across the six VCE chips 510. In 384 port situations, for example, this partitioning requires that each VCE chip 510 does a 192×128 cancellation (that is, crosstalk cancellation for 192 victims (V=384/2 groups) and 128 disturbers (D=384/3 VCE's per group)).

As shown, each vectoring cancellation VCE chip 510 in the first DSLAM 531 connects to only one vectoring cancellation VCE chip 510 in the second DSLAM 532 to exchange disturber data. Within each group, the VCE chips exchange partial accumulated products with each other. Thus the total number of logical links between all the VCE chips is $$(C/2)+((C/2)*((C/2)-1))$$

The number of logical links between the VCE is thus reduced, while the complexity of the co-ordination is not as high as the "partition by tones" method described above.

Figure 5:
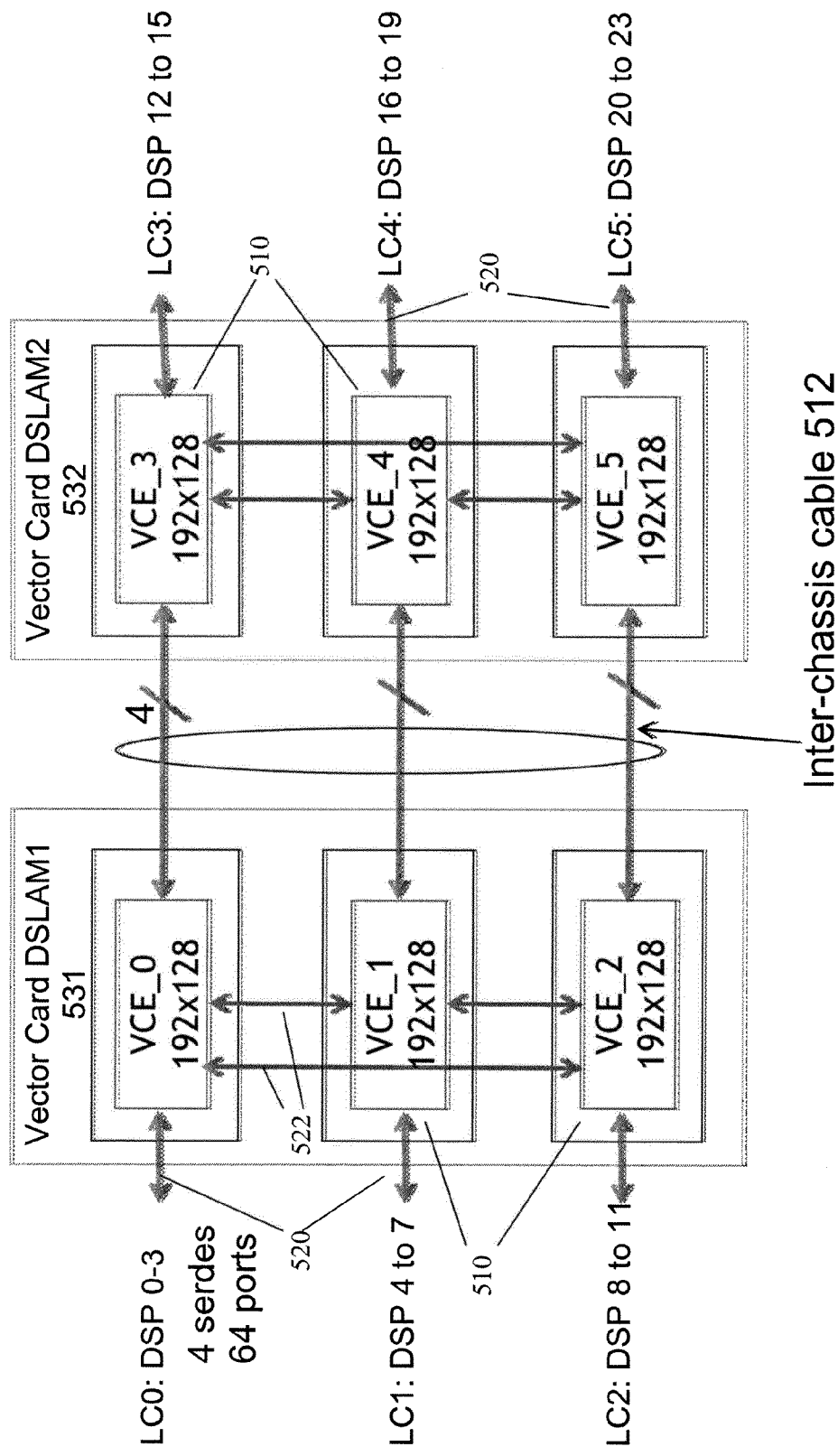
FIG. 5 pictorially illustrates a first possible double-criteria partitioning for vector cancellation according to the invention.

In an example system such as that shown in FIG. 5 having 384 ports and a VDSL2 17a profile, DSLAMs 531 and 532 include one vector card per DSLAM, and three VCEs per vector card, and each VCE connecting to the DSPs of a line card. Here, each line card is shown as handling 64 ports using four DSPs per line card, each DSP handling 16 ports. Each DSP on a line card connects to its VCE through a 10 Gbps SerDes link, so that each line card has four 10 Gbps SerDes links to its VCE. In the example of FIG. 5, the links 520 connecting a line card to a VCE are shown as a single logical link that represents four 10 Gbps SerDes links. This example method requires a VCE on a vector card to connect to only one other VCE on the other vector card with a 40 Gbps bandwidth that can be accomplished using, for example, a 40 Gbps (4×10 Gbps) inter chassis cable 512. Three such 40 Gbps cables 512 are thus needed between DSLAM chassis 531, 532. This example method further requires each VCE to connect to all other VCEs within its group, i.e. to two other VCEs within the same vector card in the DSLAM. The bandwidth between two VCEs in the same vector card is also 40 Gbps. The links 522 between any two VCEs is shown in FIG. 5 as a single logical link that represents 40 Gbps (4×10 Gbps links). In this example, since each VCE talks to three other VCEs (each requiring 4 SerDes links) and four DSP chips (each requiring 1 SerDes link), each VCE 510 thus needs 16 SerDes links (10 Gbps each). Accordingly, there are a total of nine logical links between all the VCEs, each logical link implemented in this example by four 10 Gbps SerDes links.

Figure 6:
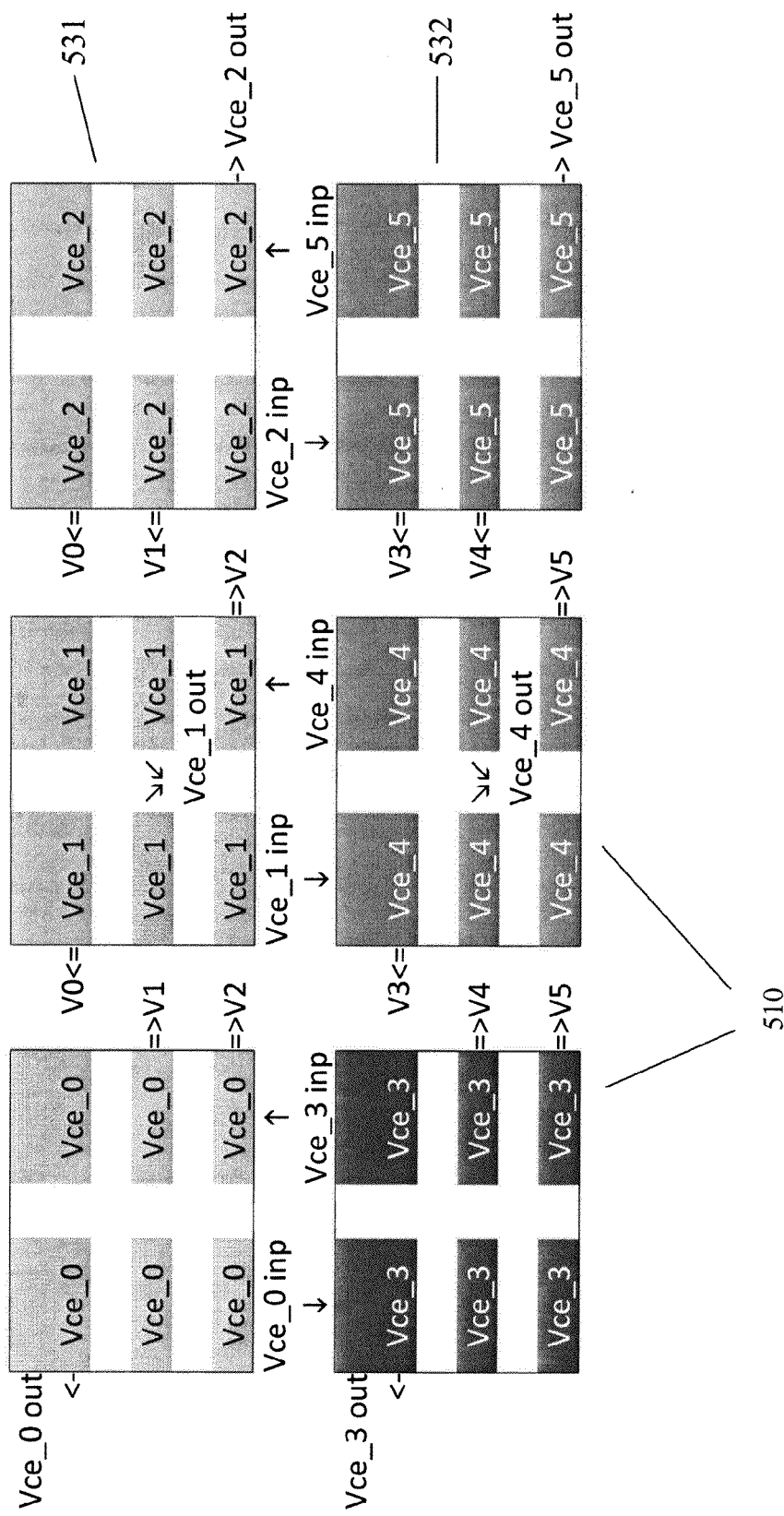
FIG. 6 is a diagram illustrating data flow in a first possible double-criteria partitioning for vector cancellation according to the invention.

The data flow between VCE chips for this type of partitioning in an example system having 384 ports and six VCE chips is shown in more detail in FIG. 6. As shown in FIG. 6, to partition within each group 531, 532 by disturber, each VCE 510 sends a sum of products for its columns, and does a final sum. In this example, there is no need to send a sum containing a diagonal element (coef of 1). It should be noted that FIG. 6 does not show the flow between the VCE chips for control messages and training related data (slicer error, FFT data etc).

Figure 7:
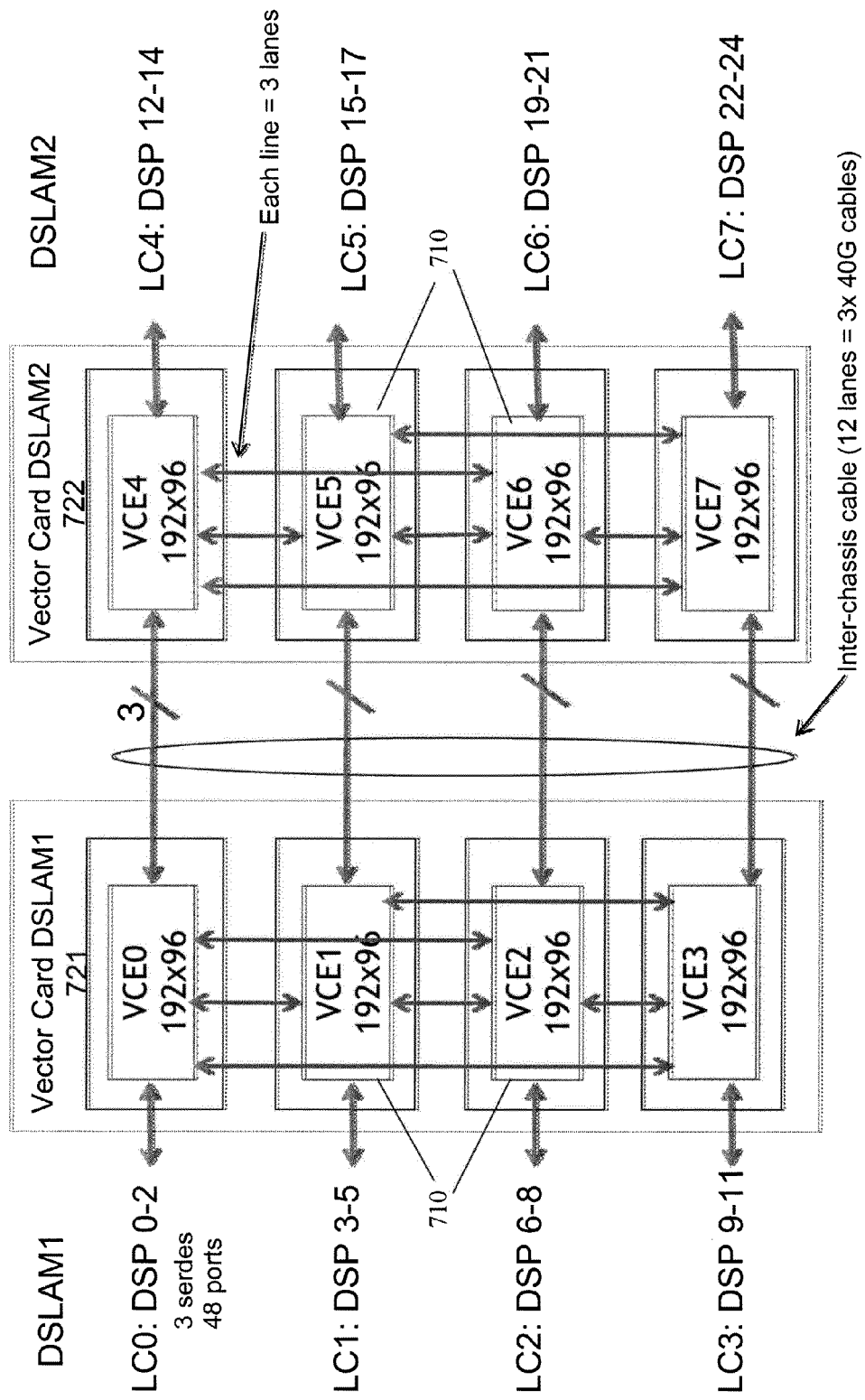
FIG. 7 pictorially illustrates a second possible double-criteria partitioning for vector cancellation according to the invention.

In a different embodiment, FIG. 7 illustrates partitioning by a victim-disturber partitioning across eight VCE chips 710 in two groups 721, 722 for the 384 port case, with each VCE chip 710 doing 192×96 cancellation. More particularly, as shown in FIG. 7, the VCE chips 710 are first split into two groups 721, 722 of VCEs based on the disturbers. In an example system of eight VCE chips for 384 ports, each VCE chip 710 does 192×96 cancellation. The first group 721 of VCE chips handles the calculation for the first 192 victim ports, and the second group 722 of VCE chips handles the calculation for the second 192 victim ports. Each VCE in the first group connects to only one other VCE in the other group and exchanges disturber data with it.

Figure 8:
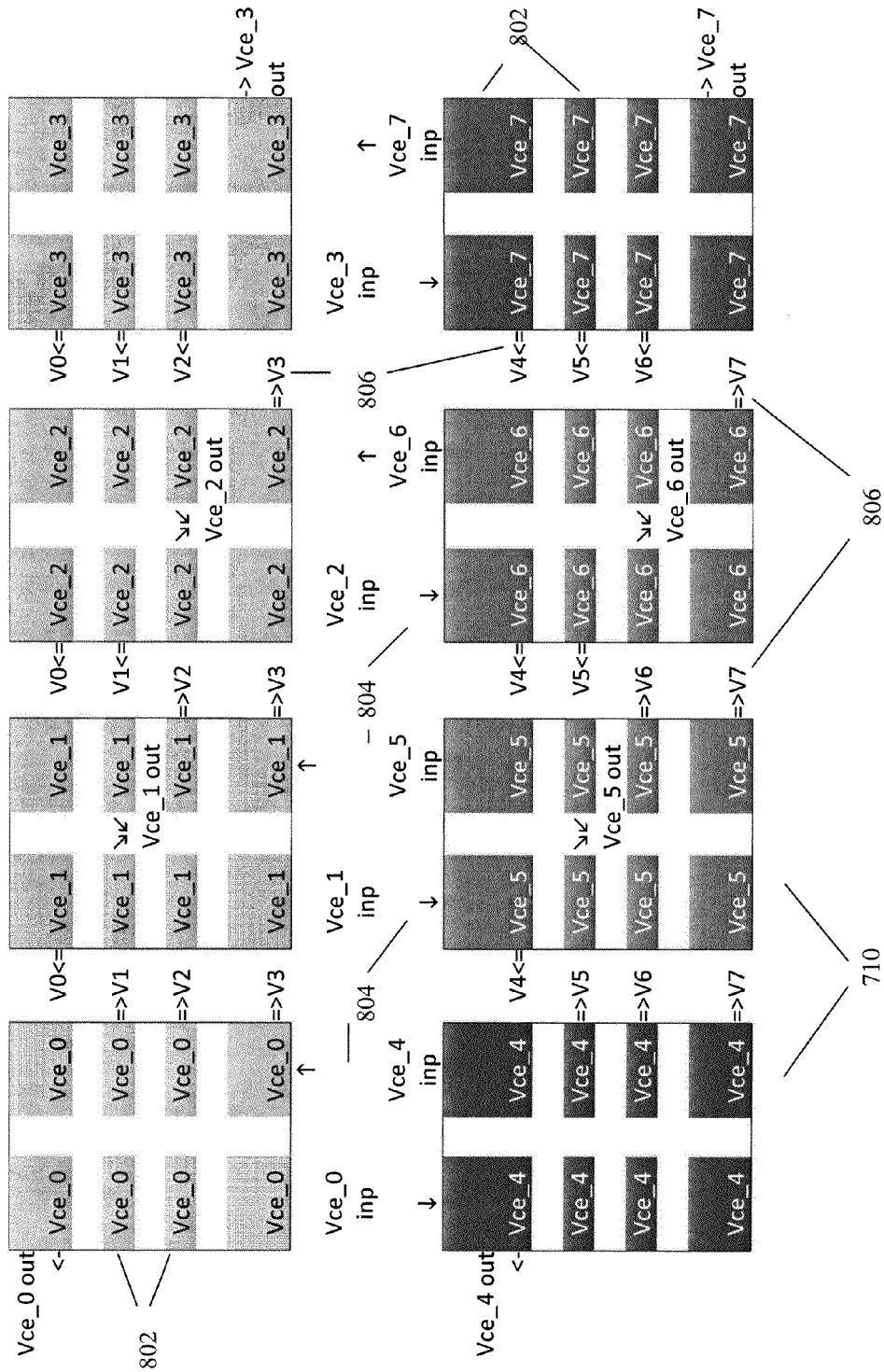
FIG. 8 is a diagram illustrating data flow in a second possible double-criteria partitioning for vector cancellation according to the invention.

The data flow between the VCE chips for this partitioning of 384 ports into eight VCE chips using the victim-disturber partitioning mode of operation is shown in FIG. 8. Note that this does not show the flow between the VCE for the control messages and training related data (slicer error, fft data etc).

In this example, each VCE chip 710 calculates a set of partial accumulated products to be sent to other chips in the same group, and also computes the outputs for its victims by adding the partial accumulated products received (from other chips in the same group) to the values it calculates.

FIG. 8 shows the disturbers as columns and victims as rows (similar to FIG. 1) for illustrating the data flow for the embodiment of FIG. 7. The tones dimension is not shown as the partitioning is by victim and disturber only. The first group 721 of VCE chips 710 (consisting of Vce_0 through Vce_3) handles the calculation for the first 192 victim ports, and the second group 722 (consisting of Vce_4 through Vce_7) of VCE chips 710 handles the calculation for the second 192 victim ports. In the example shown in FIG. 8, each colored box 802 inside a VCE 710 represents 48×48 cancellation, and each VCE 710 has 4 rows and 2 columns of such boxes 802 to perform 192×96 cancellation. The single-line arrows 804 are used to indicate sending of disturber data and the double-line arrows 806 are used to indicate sending of partial accumulated products.

The VCE chip numbered 'm' ($VCE_m$) for 'm' ranging from 0 to '(C/2)−1', in the first group of VCEs, calculates the cross-talk cancelled output y[t,v] for tone 't' ranging from 0 to T−1 and victim 'v' ranging from ((m)*(N/C)) to (((m+1)*(N/C))−1) as:

$$y[t,v]=\Sigma(z[j,t,v]) \text{ for } j=0 \text{ to } (C/2)-1 \qquad \text{Eq. 10}$$

where z[j,t,v] is the sum of partial accumulated products calculated by VCE chip 'j' for tone 't', victim 'v' as in the equation below.

The VCE chip numbered 'm' ($VCE_m$) for 'm' ranging from 0 to '(C/2)−1', in the first group of VCEs, also calculates the sum of partial accumulated products z[m,t,v] for tone 't' ranging from 0 to T−1, and victim 'v' ranging from 0 to (N/2)−1 as:

$$z[m,t,v]=\Sigma(x[t,k]*h[t,k,v]) \text{ for } k=((m)*(N/C)) \text{ to } (((m+1)*(N/C))-1) \text{ and for } k=((M+(C/2))*(N/C)) \text{ to } (((m+1+(C/2))*(N/C))-1) \qquad \text{Eq. 11}$$

The VCE chip numbered 'm' ($VCE_m$) for 'm' ranging from '(C/2)' to 'C−1', in the second group of VCE, calculates the cross-talk cancelled output y[t,v] for tone 't' ranging from 0 to T−1, and victim 'v' ranging from ((m)*(N/C)) to (((m+1)*(N/C))−1) as:

$$y[t,v]=\Sigma(z[j,t,v]) \text{ for } j=(C/2) \text{ to } C-1 \qquad \text{Eq. 12}$$

where z[j,t,v] is the sum of partial accumulated products calculated by VCE chip 'j' for tone 't', victim 'v' as in the equation below.

The VCE chip numbered 'm' ($VCE_m$) for 'm' ranging from '(C/2)' to 'C−1', in the second group of VCE, calculates the sum of partial accumulated products z[m,t,v] for tone 't' ranging from 0 to T−1, and victim 'v' ranging from N/2 to N−1 as:

$$z[m,t,v]=\Sigma(x[t,k]*h[t,k,v]) \text{ for } k=((m-(C/2))*(N/C)) \text{ to } (((M+1-(C/2))*(N/C))-1) \text{ and for } k=((m*(N/C)) \text{ to } (((m+1)*(N/C))-1) \qquad \text{Eq. 13}$$

In a more generalized sense, victim-disturber partitioning according to one or more embodiments herein can be seen as dividing the N DSL lines/ports in a vectored group into D groups of disturbers and V groups of victims. Using a group of C vectoring cancellation VCE chips, the C chips can first be divided into two or more victim DSL line groups that each process data for N/V victim lines. Each vectoring cancellation VCE chip in each such victim DSL line group is then assigned N/D disturber lines for crosstalk cancellation processing.

Figure 9:
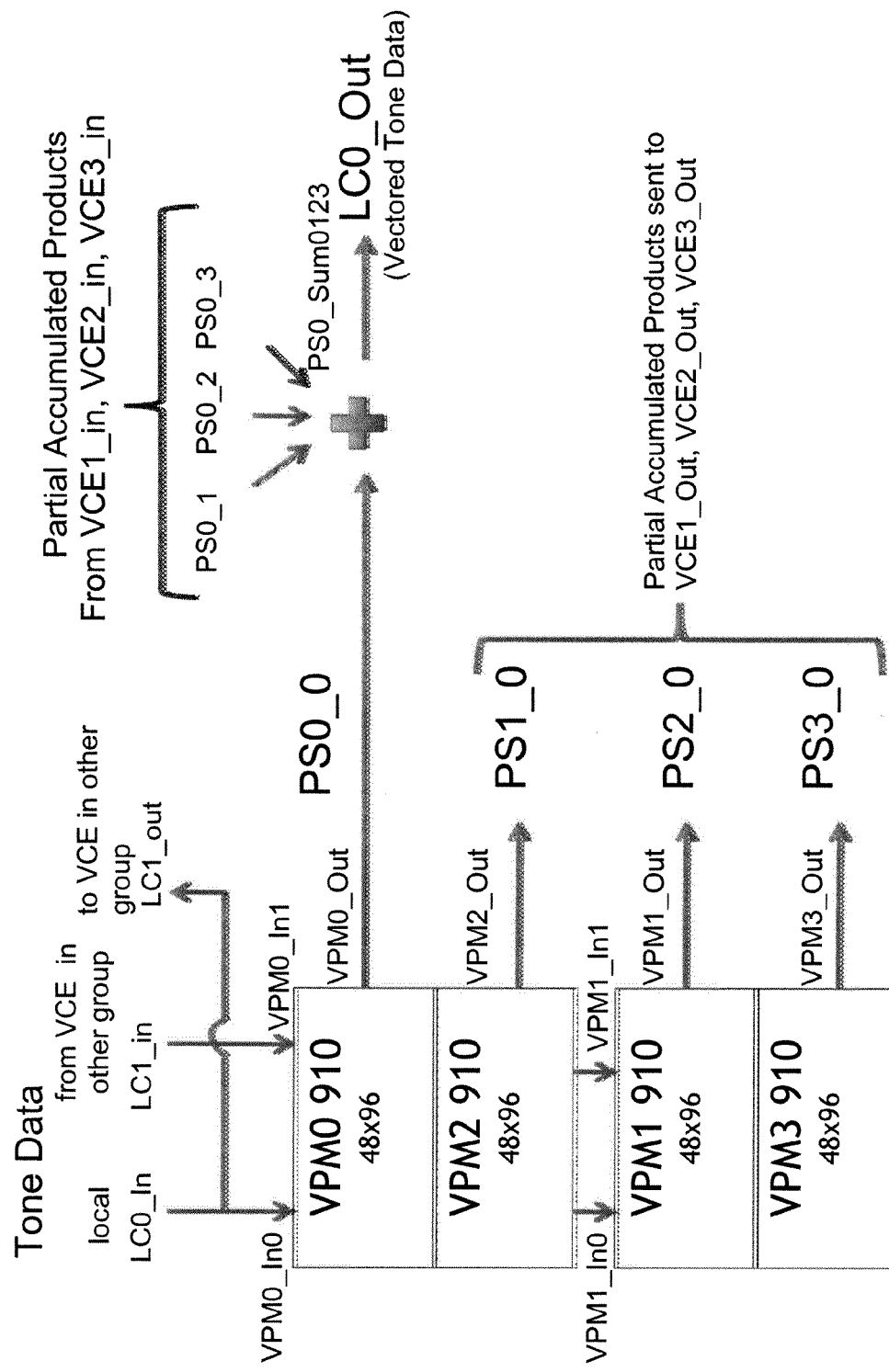
FIG. 9 is a block diagram illustrating an example internal configuration of a vector cancellation chip according to aspects of the invention.

FIG. 9 shows one example of the internal configuration of a VCE (e.g. VCE_0) for the partitioning by 'victim and disturber' method described above in connection with FIGS. 7 and 8 for the 384 port 8 VCE case. In this case, each VCE does 192×96 cancellation. The cancellation logic in a VCE can be organized in various ways. An embodiment shown in FIG. 9, organizes the cancellation as four blocks referred to here as VPM (vector product matrix) 910, with each VPM 910 handling 48 victims by 96 disturbers. The four VPMs are configured as four rows by one column, to do a 192×96 cancellation. A VPM 910 is equivalent to two of the colored 48×48 boxes 802 in FIG. 8. This organization of VPMs is chosen so that it can be configured to support either the partitioning by 'victim and disturber' method as described in connection with FIGS. 5 to 8 or the 'disturber and victim' method described below in connection with FIG. 13.

Here, VCE_0 sends out the disturber data it received on its input LC0_In from its DSPs, to the corresponding VCE in the other group VCE_4, and receives from that VCE_4, the disturber data from the DSPs attached to VCE_4. These disturber data in VCE_0 are fed into VPM0 and VPM1 through its input VPM0_In0 and VPM0_In1. In this 'victim and disturber' method, a VCE is used as 192×96 canceller, and as shown in the figure, the input VPM0_In0 is sent internally to VPM1_In0 and input VPM0_In1 is sent internally to VPM1_In1 to VPM1 and VPM3. The VCE also gets partial accumulated products (also known as partial vector sums) from other VCE. Here, VCE_0 gets partial accumulated products PS0_1, PS0_2, PS0_3 from VCE_1, VCE_2, and VCE_3 respectively. The sum of products 'VPM0_Out' that VPM0 calculates, is added to PS0_1, PS0_2, PS0_3 to calculate the final output 'LC0_Out' for the first 48 victims and sent out to the DSP chips that VCE_0 is connected to. The sum of products 'VPM2_Out' that VPM2 calculates, is sent to VCE1. The sum of products 'VPM1_Out' that VPM1 calculates, is sent to VCE_2, and the sum of products 'VPM3_Out' that VPM3 calculates, is sent to VCE_3.

Figure 10:
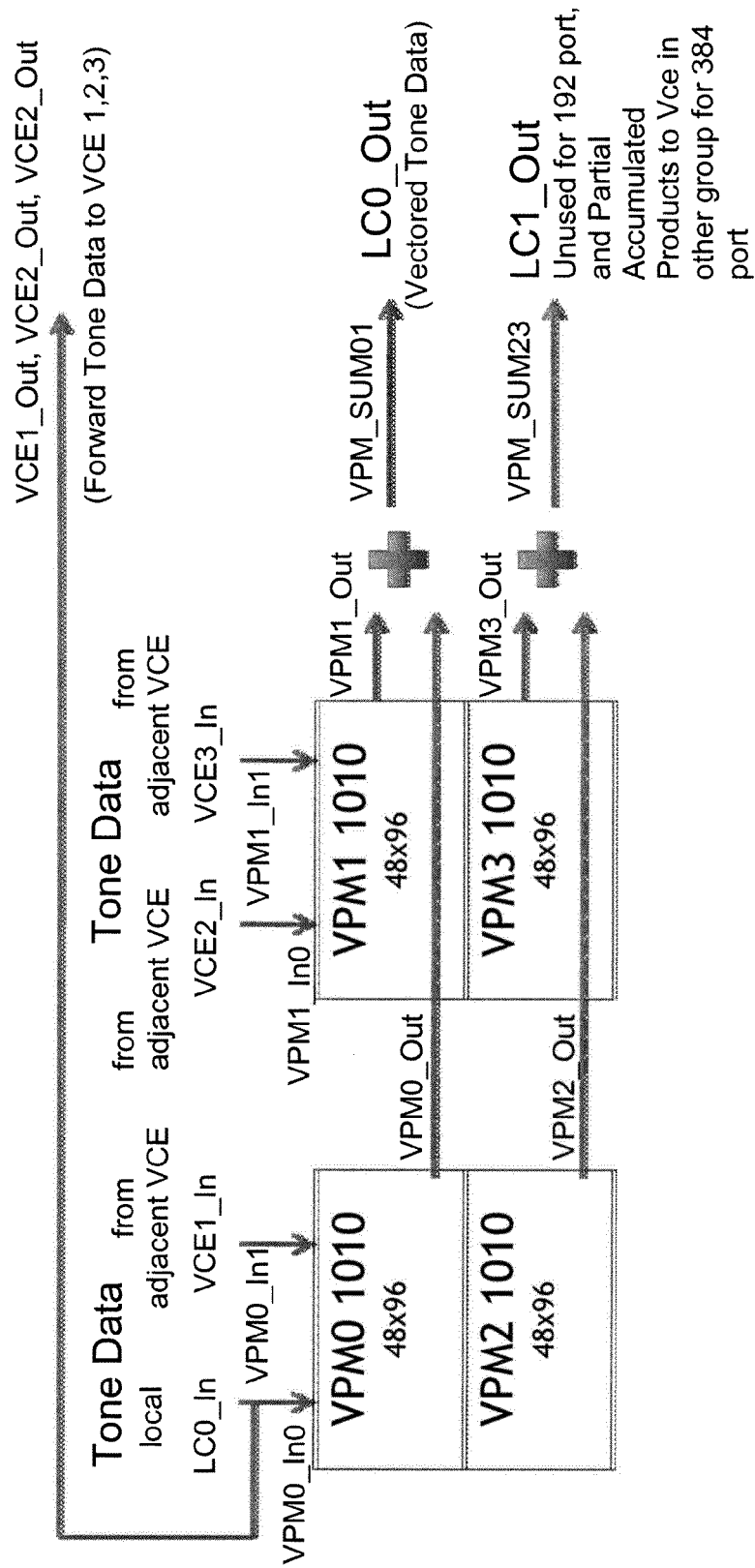
FIG. 10 is a block diagram illustrating another example internal configuration of a vector cancellation chip according to aspects of the invention.

FIG. 10 shows one example of the internal configuration of VCE_0 for the partitioning by 'disturber and victim' method described in more detail below in connection with FIG. 13. In embodiments, one board with four VCEs can support the 192 port case and the same board with firmware configuration change can be connected to similar board on a second DSLAM for the 384 port eight VCE case. The embodiment shown in FIG. 10 organizes the cancellation as four blocks referred to here as VPM (vector product matrix) 1010, with each VPM 1010 handling 48 victims by 96 disturbers. The four VPMs are configured as two rows by two columns, to do a 96×192 cancellation. A VPM is equivalent to two of the colored 48×48 boxes in FIG. 13.

For the 192 port with four VCE case, VPM2 and VPM3 are unused and can be powered down. This configuration is used in a vector card for a 192-port DSLAM when it is desirable to upgrade in the future to a 384 port cancellation when a second 192-port DSLAM is added. In that case, the VCEs in one board can each be connected to a corresponding VCE in the other board by inter-chassis cables as in FIG. 7, and the firmware can enable the VPM2 and VPM3 of each VCE.

Here, each VCE is used as 96×192 canceller, and VCE_0 sends out the disturber data it received on its input LC0_In from its DSPs, to all other VCEs in the same group (VCE_1, VCE_2, VCE_3). VCE_0 also gets the disturber data VCE1_In, VCE2_In, and VCE3_In from the other VCEs in the same group. The disturber data LC0_In and VCE1_In are fed into VPM0 and VPM2, and disturber data VCE2_In and VCE3_In are fed into VPM1 and VPM3. The partial accumulated products of VPM0 and VPM1 are added to get the final output 'LC0_Out' for the first 48 victims and sent out to the corresponding DSP chips. In the 384 port case, the partial accumulated products of VPM2 and VPM3 are added to get the final output 'LC1_Out' for the second 48 victims and sent out to the corresponding DSP chips.

Figure 11:
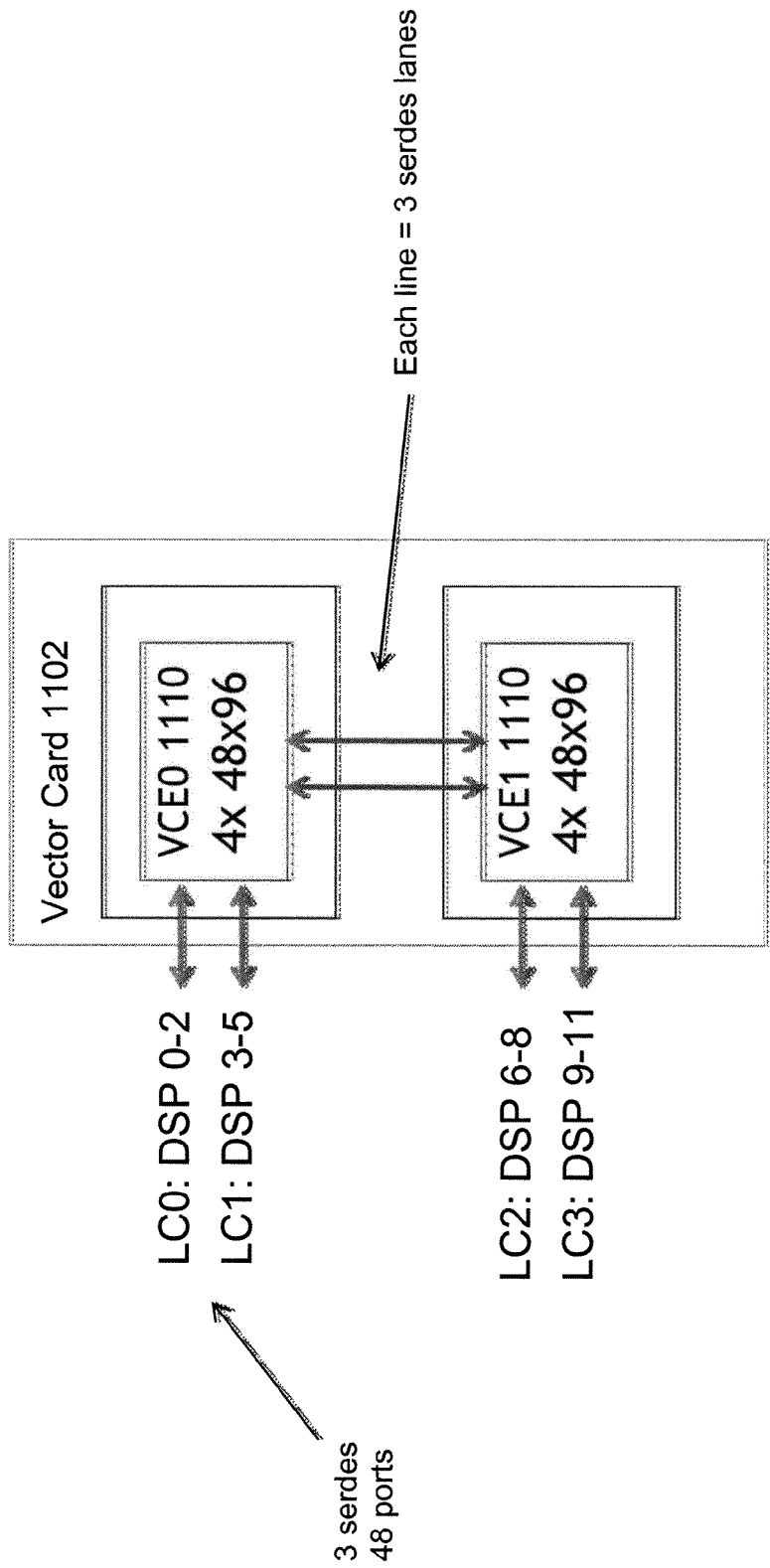
FIG. 11 is a block diagram illustrating an example vector card that can be used to implement certain aspects of the invention.

FIG. 11 shows one example of a vector card 1102 with two VCEs that can support cancellation of 96 ports or 192 ports. Note that the configuration shown in FIG. 10 used four VCEs for 192 ports in order to keep it upgradeable without hardware change to 384 ports. For 192 port vector cancellation systems that do not need to be upgradeable beyond 192 ports, the two VCE configuration of FIG. 11 can be used.

Figure 12:
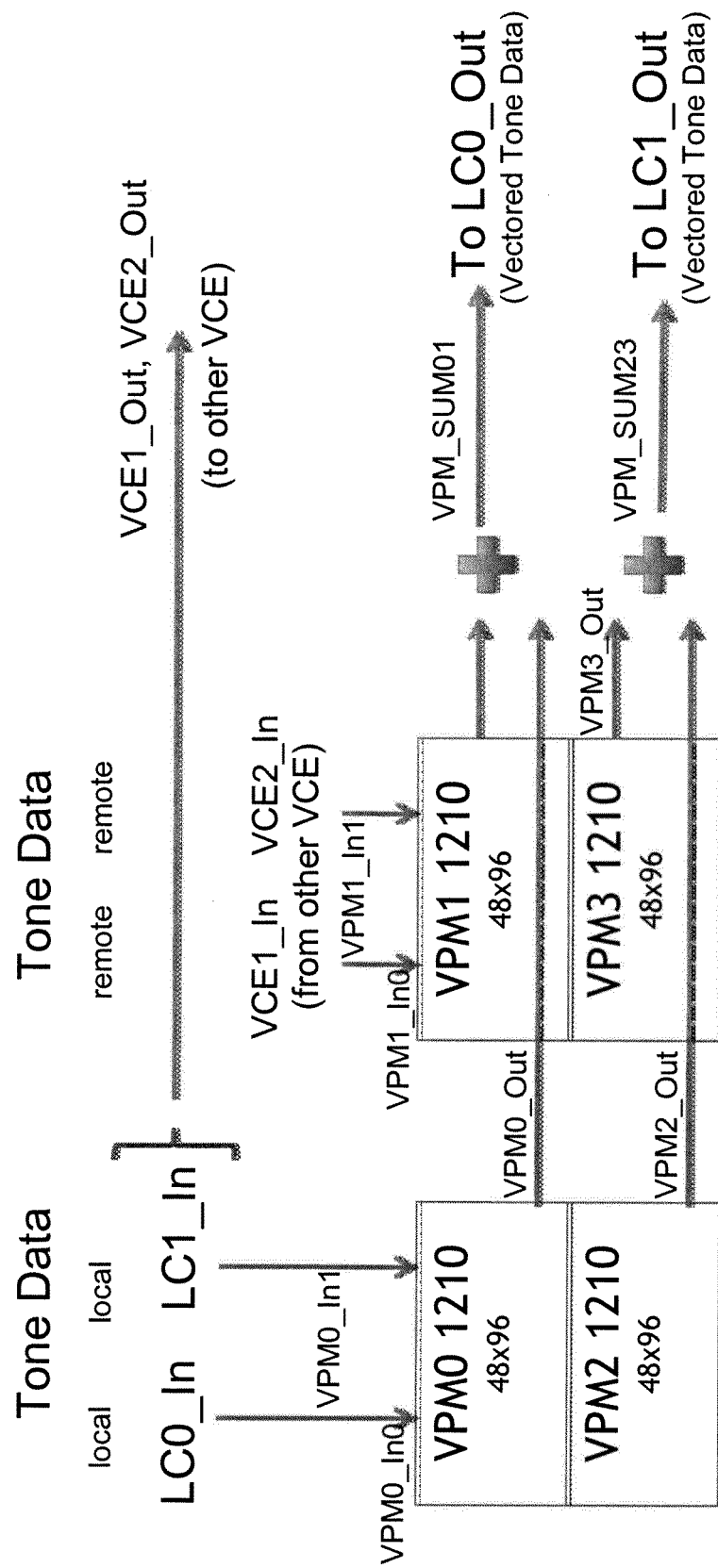
FIG. 12 is a block diagram illustrating yet another example internal configuration of a vector cancellation chip according to aspects of the invention.

FIG. 12 shows an example of the internal configuration of VCE_0 for the partitioning by 'disturber and victim' method described in connection with FIG. 13 for the 192 port cancellation with two VCEs. The configuration is similar to that of the FIG. 10 (192 port with four chips), except that the sum of VPM2 and VPM3 in this case is the second set of output LC1_Out.

An alternate partitioning to the victim-disturber method described above is shown in FIG. 13. In this alternative method called a disturber-victim method, the VCE chips are first split into two chip groups by disturber, and then each group by victims. In this case, each VCE chip in the first group connects to only one VCE chip in the second group to exchange partial accumulated products. Within each group, the VCE chips exchange disturber data with each other.

Figure 13:
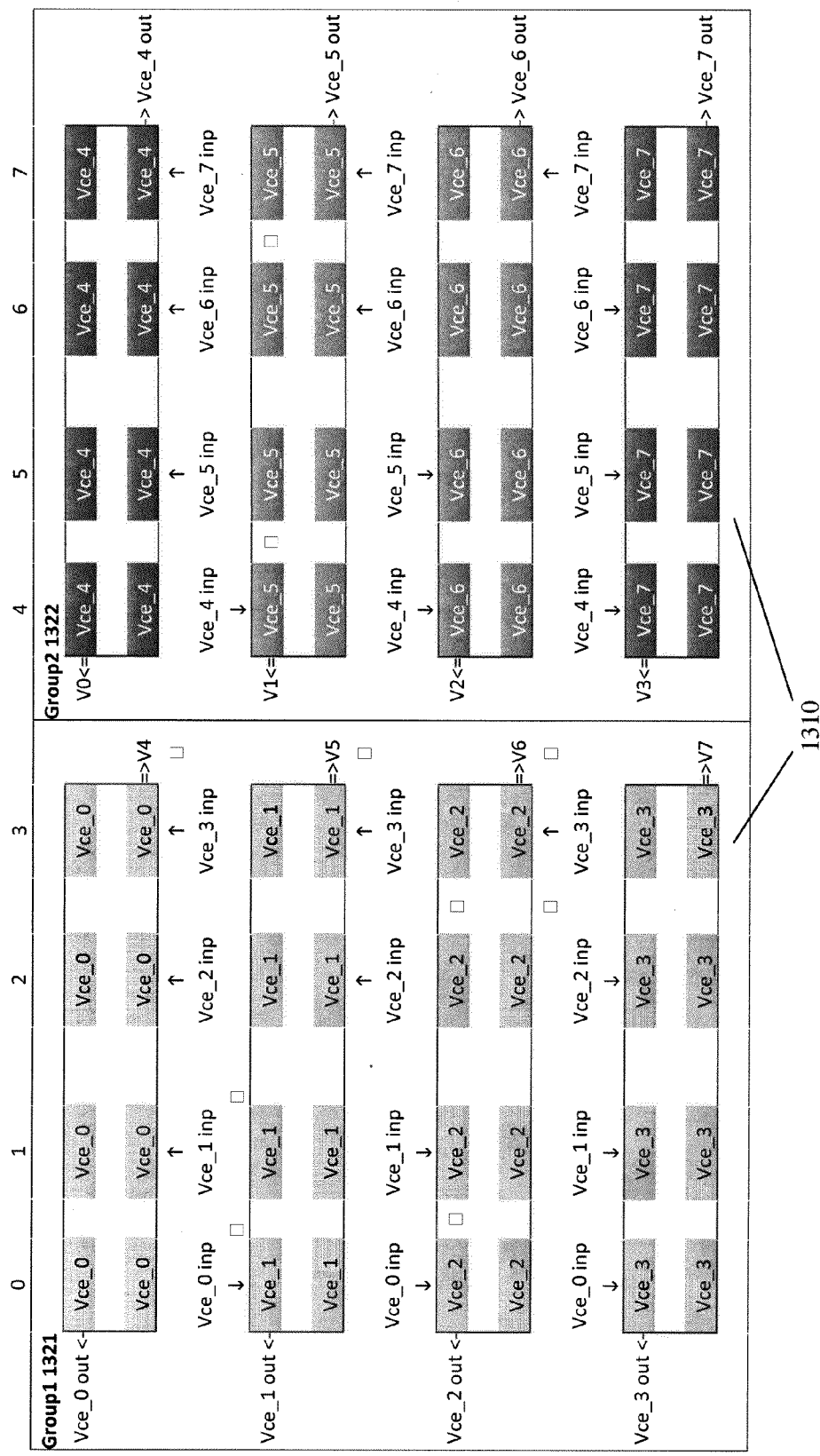
FIG. 13 is a diagram illustrating data flow in a third possible double-criteria partitioning for vector cancellation according to the invention.

In the example shown in FIG. 13, partitioning is performed across eight VCE chips 1310 for the 384 port case, with each VCE chip 1310 doing 96×192 cancellation.

The first group 1321 of VCE chips handles the disturber data from the first 192 ports, and the second group 1322 of VCE chips handles the disturber data from the second 192 ports. Each VCE 1310 in the first group connects to only one other VCE 1310 in the other group and exchanges partial accumulated products with it. Within each group 1321, 1322, each VCE chip 1310 sends its disturber data (that it has received from the DSPs connected to it) to all other VCE chips in the same group. Thus the number of logical links between the VCE chips is $$(C/2)+((C/2)*((C/2)-1))$$

The number of logical links between the VCEs is thus reduced, while the complexity of the co-ordination is not as high as the 'partition by tones' method.

FIG. 13 further shows the dataflow between the VCEs for this partitioning of 384 ports into eight VCE chips, by the 'disturbers and victims' method. Note that this does not show the flow between the VCEs for the control messages and training related data (slicer error, fft data etc).

In this partitioning, each VCE chip calculates a set of partial accumulated products to be sent to its corresponding chip in the other group, and also computes the outputs for its victims by adding the partial accumulated products received from its corresponding chip in the other group to the values it calculates.

The VCE chip numbered 'm' ($VCE_m$) for 'm' ranging from 0 to '(C/2)−1', in the first group of VCEs, calculates the cross-talk cancelled output y[t,v] for tone 't' ranging from 0 to T−1, and victim 'v' ranging from ((m)*(N/C)) to (((m+1)*(N/C))−1) as:

$$y[t,v]=z[m+C/2,t,v]+\Sigma(x[t,k]*h[t,k,v]) \text{ for } k=0 \text{ to } (N/2)-1 \quad \text{Equation 14}$$

where z[j,t,v] is the sum of partial accumulated products calculated by VCE chip 'j' for tone 't', victim 'v'.

The VCE chip numbered 'm' ($VCE_m$) for 'm' ranging from 0 to '(C/2)−1', in the first group of VCEs also calculates the sum of partial accumulated products z[m,t,v] for tone 't' ranging from 0 to T−1, and victim 'v' ranging from ((m+(C/2))*(N/C)) to (((m+1+(C/2))*(N/C))−1) as:

$$z[m,t,v]=\Sigma(x[t,k]*h[t,k,v]) \text{ for } k=0 \text{ to } (N/2)-1 \quad \text{Equation 15}$$

The VCE chip numbered 'm' ($VCE_m$) for 'm' ranging from '(C/2)' to 'C−1', in the second group of VCEs, calculates the cross-talk cancelled output y[t,v] for tone 't' ranging from 0 to T−1, and victim 'v' ranging from ((m)*(N/C)) to (((m+1)*(N/C))−1) as:

$$y[t,v]=z[m-C/2,t,v]+\Sigma(x[t,k]*h[t,k,v]) \text{ for } k=(N/2) \text{ to } N-1 \quad \text{Equation 16}$$

where z[j,t,v] is the sum of partial accumulated products calculated by VCE chip 'j' for tone 't', victim 'v'.

The VCE chip numbered 'm' ($VCE_m$) for 'm' ranging from '(C/2)' to 'C−1', in the second group of VCEs also calculates the partial accumulated product z[m,t,v] for tone T ranging from 0 to T−1, and victim 'v' ranging from ((m−(C/2))*(N/C)) to (((m+1−(C/2))*(N/C))−1) as:

$$z[m,t,v]=\Sigma(x[t,k]*h[t,k,v]) \text{ for } k=(N/2) \text{ to } N-1 \quad \text{Equation 17}$$

Figure 14:
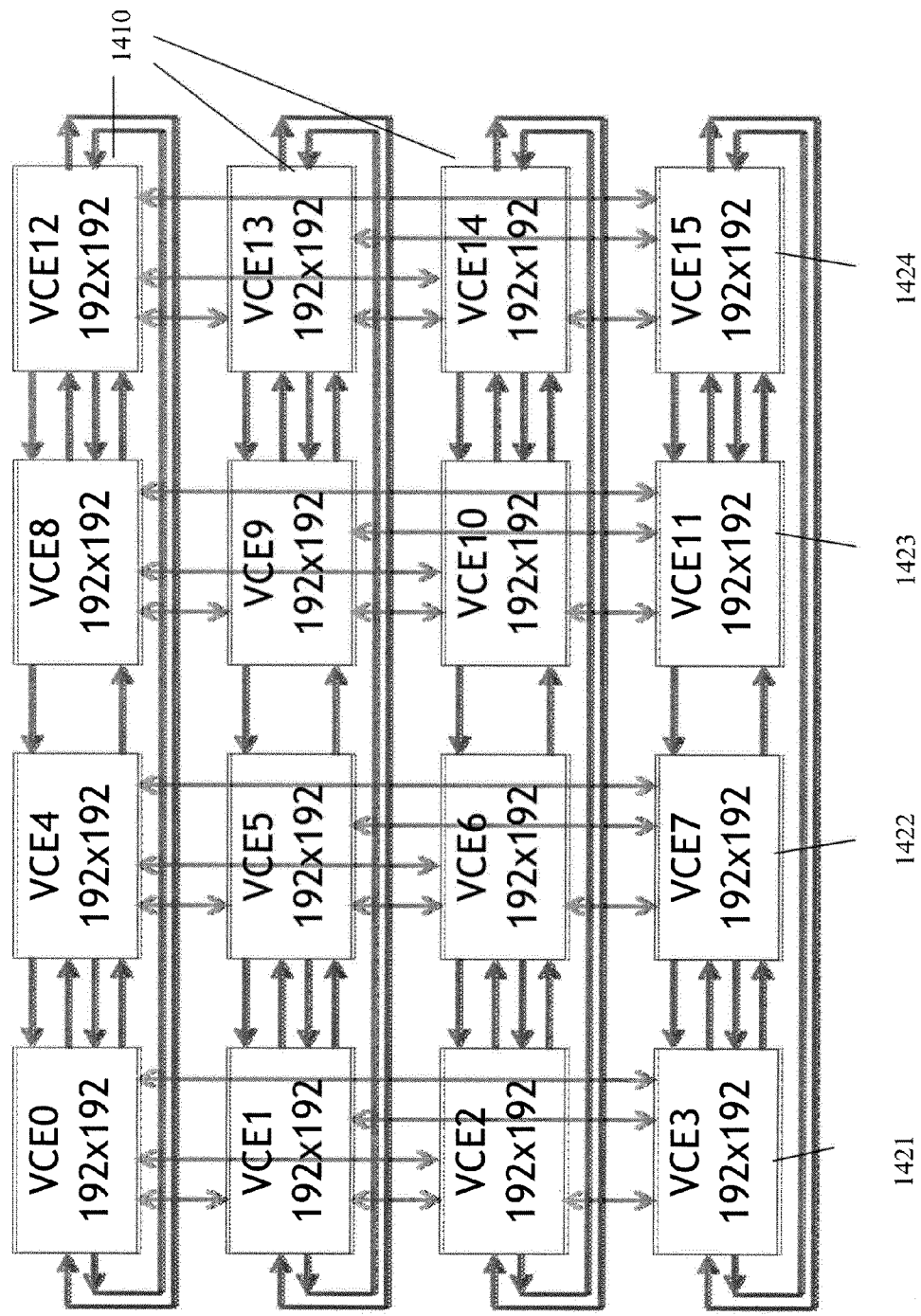
FIG. 14 pictorially illustrates another possible double-criteria partitioning for vector cancellation according to the invention.

It should be noted that many alternative ways of partitioning VCE chips are possible. For example, FIG. 14 illustrates an example system having 768 ports in which 16 VCE chips 1410 are split into four groups 1421, 1422, 1423 and 1424, with four VCE chips 1410 in each group. In one example, the VCEs are first grouped by disturber, and then within each group by victim, with each chip performing 192×192 cancellation. Those skilled in the art will appreciate further details of this and other possible partitions after being taught by the above examples.

Embodiments of the subject matter disclosed here can be implemented in a vector canceller ASIC (application-specific integrated circuit), or in an FPGA (field programmable gate array). For example, each vectoring cancellation VCE chip can be a separate device (ASIC, FPGA, etc.) on which are defined multiple processing units, for example as shown in FIGS. 7 and 9. Other hardware implementations are available, as will be appreciated by those skilled in the art.

The partitioning of computation across VCE chips allows larger number of ports in the vectored group—this would be needed for large scale deployment of vectored DSL systems (for example, vectored VDSL systems and the like). Different partitioning schemes for distributing computation across multiple VCE chips are disclosed herein. Victim-disturber or disturber-victim partitioning reduces the number of logical links between VCE chips, while keeping complexity of the coordination at a simpler level than, for example, the "partition by tones" scheme.

The many features and advantages of the present disclosure's subject matter are apparent from the written description, and thus, the appended claims are intended to cover all such features and advantages. Further, since numerous modifications and changes will readily occur to those skilled in the art, vector partitioning is not limited to the exact construction and operation as illustrated and described. Therefore, the described embodiments should be taken as illustrative and not restrictive, and vector partitioning hereunder should not be limited to the details given herein but should be defined, inter alia, by the following claims and their full scope of equivalents, whether foreseeable or unforeseeable now or in the future.

Accordingly, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for performing vectored DSL crosstalk cancellation in a DSL system, the method comprising:
   defining D disturber lines in the DSL system;
   defining V victim lines in the DSL system;
   defining T DSL tones in the DSL system;
   partitioning crosstalk cancellation among a plurality of C vectoring cancellation chips by a double criteria; and
   causing each of the vectoring cancellation chips to perform a partial cancellation based on the double criteria,
   wherein the double criteria is victim-disturber partitioning, and wherein the victims are first partitioned into $G_v$ groups of a plurality of the V victim lines each, wherein $G_v$ is an integer number of two or more, with each group of $V/G_v$ victims further partitioned based on disturbers among $G_d$ vectoring cancellation chips, wherein $G_d$ is an integer number of two or more, and wherein $G_d \times G_v = C$, and wherein performing the partial cancellation comprises computing by each vectoring cancellation chip, for a given group of the plurality of $V/G_v$ victims, a partial accumulated product for a plurality of $D/G_d$ of the D disturber lines and all tones $t=0$ to $T-1$.

2. A method according to claim 1, wherein the DSL system comprises N ports, and wherein $D=V=N$.

3. A method according to claim 1, wherein the system comprises C vectoring cancellation chips grouped in $G_v$ groups of $C/G_v$ vectoring cancellation chips each, and wherein each vectoring cancellation chip in a group only performs the partial cancellation for a group of $V/G_v$ victims and the $D/G_d$ disturbers for all tones $t=0$ to $T-1$.

4. A method according to claim 1, wherein performing the partial cancellation further comprises, within each group of $V/G_v$ victims, communicating the partial accumulated products for all D disturbers between all of the $G_d$ vectoring cancellation chips.

5. A method according to claim 4, further comprising:
   communicating partial accumulated products between only one of the $G_d$ vectoring cancellation chips for a first group of $V/G_v$ victims to only one of the $G_d$ vectoring cancellation chips for a second group of $V/G_v$ victims; and
   summing the communicated partial accumulated products to obtain complete crosstalk cancellation for all D disturbers, all V victims and all T tones.

6. A method for performing vectored DSL crosstalk cancellation in a DSL system, the method comprising:
   defining D disturber lines in the DSL system;
   defining V victim lines in the DSL system;
   defining T DSL tones in the DSL system;
   partitioning crosstalk cancellation among a plurality of C vectoring cancellation chips by a double criteria; and
   causing each of the vectoring cancellation chips to perform a partial cancellation based on the double criteria,
   wherein the double criteria is disturber-victim partitioning, and wherein the disturbers are first partitioned into $G_d$ groups of a plurality of the D disturber lines each, wherein $G_d$ is an integer number of two or more, with each group of $D/Gd$ disturbers further partitioned based on victims among $G_v$ vectoring cancellation chips, wherein $G_v$ is an integer number of two or more, and wherein $G_d \times G_v = C$, and wherein performing the partial cancellation comprises computing by each of the vectoring cancellation chips, for a given group of the plurality of $D/G_d$ disturbers, a partial accumulated product for a plurality of $V/G_v$ of the victim lines and all tones $t=0$ to $T-1$.

7. A method according to claim 6, wherein the system comprises C vectoring cancellation chips grouped in $G_d$ groups of $C/G_d$ vectoring cancellation chips each, and wherein each vectoring cancellation chip in a group only performs the partial cancellation for a group of $D/G_d$ disturbers and the $V/G_v$ disturbers for all tones $t=0$ to $T-1$.

8. A method according to claim 6, wherein performing the partial cancellation further comprises, within each group of $D/G_d$ disturbers, communicating the partial accumulated products for all V victims between all of the $G_v$ vectoring cancellation chips.

9. A method according to claim 8, further comprising:
   communicating partial accumulated products between only one of the $G_v$ vectoring cancellation chips for a first group of $D/G_d$ distubers to only one of the $G_v$ vectoring cancellation chips for a second group of $D/G_d$ disturbers; and
   summing the communicated partial accumulated products to obtain complete crosstalk cancellation for all D disturbers, all V victims and all T tones.

10. A vector cancellation system for a DSL system having D disturber lines, V victim lines, T DSL tones, and C vector cancellation chips, the system comprising:
    a first plurality of the vector cancellation chips; and
    a second plurality of the vector cancellation chips,
    the first and second pluralities of vector cancellation chips each performing a respective partial cancellation, the partitioning of vector cancellation between the first and second pluralities being based on a double criteria,
    wherein the double criteria is victim-disturber partitioning, and wherein the victims are first partitioned into $G_v$ groups of a plurality of the V victim lines each, wherein $G_v$ is an integer number of two or more, with each group of V/$G_v$ victims further partitioned based on disturbers among Ga vectoring cancellation chips, wherein $G_d$ is an integer number of two or more, and wherein $G_d \times G_v = C$ and wherein performing the partial cancellation comprises computing by each vectoring cancellation chip, for a given group of the plurality of V/$G_v$ victims, a partial accumulated product for a plurality of D/$G_d$ of the D disturber lines and all tones t=0 to T−1.

11. A vector cancellation system according to claim 10, further comprising communication links between all of the $G_d$ vectoring cancellation chips for each group of V/$G_v$ victims.

12. A vector cancellation system according to claim 11, further comprising communication links between only one of the $G_d$ vectoring cancellation chips for a first group of V/$G_v$ victims and only one of the $G_d$ vectoring cancellation chips for a second group of V/$G_v$ victims.

13. A vector cancellation system for a DSL system having D disturber lines, V victim lines, T DSL tones, and C vector cancellation chips, the system comprising:
 a first plurality of the vector cancellation chips; and
 a second plurality of the vector cancellation chips,
 the first and second pluralities of vector cancellation chips each performing a respective partial cancellation, the partitioning of vector cancellation between the first and second pluralities being based on a double criteria, the first and second pluralities of vector cancellation chips further communicating partially cancelled input data between them to form fully cancelled output for all D disturber lines, all V victim lines and all T DSL tones, wherein the double criteria is disturber-victim partitioning, and wherein the disturbers are first partitioned into $G_d$ groups of a plurality of the D disturber lines each, wherein $G_d$ is an integer number of two or more, with each group of D/$G_d$ disturbers further partitioned based on victims among $G_v$ vectoring cancellation chips, wherein $G_v$ is an integer number of two or more, and wherein $G_d \times G_v = C$, and wherein performing the partial cancellation comprises computing by each of the vectoring cancellation chips, for a given group of the plurality of D/$G_d$ disturbers, a partial accumulated product for a plurality of V/$G_v$ of the victim lines and all tones t=0 to T−1.

14. A vector cancellation system according to claim 13, further comprising communication links between all of the $G_v$ vectoring cancellation chips for each group of D/$G_d$ disturbers.

15. A vector cancellation system according to claim 14, further comprising communication links between only one of the $G_v$ vectoring cancellation chips for a first group of D/$G_d$ disturbers and only one of the $G_v$ vectoring cancellation chips for a second group of D/$G_d$ disturbers.

* * * * *

UNITED STATES PATENT AND TRADEMARK OFFICE
CERTIFICATE OF CORRECTION

PATENT NO. : 9,065,534 B2
APPLICATION NO. : 13/403956
DATED : June 23, 2015
INVENTOR(S) : Shridhar et al.

Page 1 of 1

It is certified that error appears in the above-identified patent and that said Letters Patent is hereby corrected as shown below:

Specification

In Column 9, Line 13, delete "$VCE_m$" and insert -- $VCE_m$, --, therefor.

In Column 9, Line 63, delete "(C(C-1))/2" and insert -- (C*(C-1))/2 --, therefor.

Claims

In Column 17, Line 2, in Claim 10, delete "Ga vectoring" and insert -- $G_d$ vectoring --, therefor.

In Column 17, Line 3, in Claim 10, delete "$G_d \times G_v = C$" and insert -- $G_d \times G_v = C$, --, therefor.

Signed and Sealed this
Second Day of February, 2016

Michelle K. Lee
*Director of the United States Patent and Trademark Office*